Aug. 19, 1969 R. L. HOUGH 3,462,340

FIBER-CONTAINING PYROLYTIC COMPOSITE MATERIAL

Filed July 28, 1965

INVENTOR.
RALPH L. HOUGH

BY Harry C. Herbert Jr.

ATTORNEY

United States Patent Office 3,462,340
Patented Aug. 19, 1969

3,462,340
FIBER-CONTAINING PYROLYTIC
COMPOSITE MATERIAL
Ralph L. Hough, Springfield, Ohio, assignor to the United States of America as represented by the Secretary of the Air Force
Filed July 28, 1965, Ser. No. 475,613
Int. Cl. B32b 5/12, 9/04
U.S. Cl. 161—59       3 Claims

ABSTRACT OF THE DISCLOSURE

This invention discloses novel compositions of matter in the form of composites. The composites are made up of pyrolytic fibers such as graphite, borides, nitrides or carbides imbedded in a pyrolytic matrix selected from the group comprising graphite, borides, nitrides and carbides. The fibers are arranged in parallel relation and/or at an angle to each other and/or to at least one of the matrix surfaces so as to derive the maximum beneficial properties from their incorporation into the matrix. The composites of the present invention find many uses where extreme high resistance to heat is necessary.

---

The invention described herein may be manufactured and used by the United States Government for governmental purposes without payment to me of any royalty thereon.

This invention relates to a fiber-containing pyrolytic composite material.

Pyrolytic materials such as graphite, borides, nitrides and carbides are being increasingly looked to in the arts of high speed aircraft and aerospace vehicles and launching apparatus where extremely high temperatures are often encountered of the type which only refractory materials can withstand. Because an increasing number of such applications also encounter mechanical eroding influences such as a dynamic shear of high speed gases escaping through the nozzle of a jet engine for example or the atmospheric friction attending the high speed movement of a re-entry vehicle or nose cone with the earth's atmosphere, the need for strengthening the pyrolytic material and for enabling it to maintain its dimensional stability has become increasingly important.

While composite pyrolytic materials such as filaments with a pyrolytic coating upon a filamentous substrate have been used, the use of the substrate has been primarily for the purpose of allowing the manufacture of the strand in continuous form; and, since the substrate to achieve this end has been composed of a ductile material, it lacked the refractory characteristics demanded of the composite and made little or no contribution toward preserving the material upon its exposure to operational eroding forces.

It is accordingly an object of the present invention to provide an improved fiber-containing pyrolytic composite material.

Yet another object of the invention is to provide such a composite wherein the pyrolytic material is of high purity and near theoretical density notwithstanding the dispersal of fibrous particles therein.

Still another object of the invention is to provide composite materials incorporating a variety of fibers in a variety of pyrolytic materials in particular arrangements and alignments relative to each other and to other groups thereof in such a manner that a variety of ablative and erosion-resistant effects may be achieved.

These and other objects and advantages which will appear from a reading of the following disclosure are achieved according to this invention by the simultaneous introduction of a pyrolytic material-containing deposition gas and of a plurality of discrete fibers into a conventional deposition chamber and upon a heated substrate positioned therein in such a manner that, as the pyrolytic material departs the deposition gas and becomes plated upon the heated substrate surface, it will ensnare the fibers and engulf them so that they become an integral part of the substrate coating. In modifications of the invention, the fibers are arranged according to different patterns relative to the substrate and relative to each other to achieve a variety of reinforcing effects. A broad range of fibrous materials are useful in and contemplated by the present invention as well as is a broad range of pyrolytic substances or refractory materials which may be extracted from a vapor state. In many instances according to another modification of the invention, the fibers themselves will be composed of a pyrolytic material including that of which the matrix or continuous phase of the composite is composed. The substrate upon which the material is plated within the deposition chamber according to known pyrolytic techniques may represent a mold or form from which the pyrolytic coating is ultimately removed, usually by the destruction of the substrate; or the substrate may be an integral component of the ultimately desired assembly with the result that it is coated in situ within the chamber and the fiber-containing coating remains thereon.

The invention thus generally described may be more clearly understood by reference to the following detailed description of certain preferred embodiments thereof in connection with which reference may be had to the appended drawings.

Figure 1:
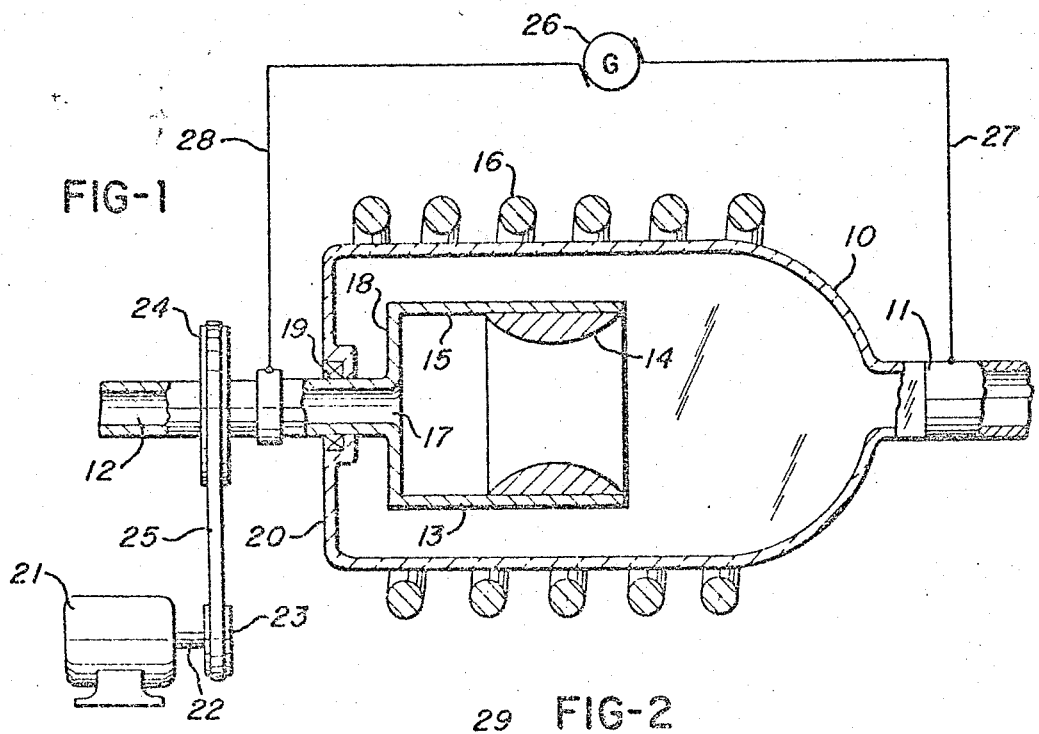
FIGURE 1 is an elevational view in partial cross section of an apparatus according to this invention for manufacturing a fiber-containing pyrolytic composite material.

In the practice of the invention according to the illustration of FIGURE 1, a conventional deposition chamber is shown to comprise the atmosphere-confining receptacle 10 composed of glass, quartz or other refractory and electrically insulative material and to be provided with a terminal inlet tube 11 and exhaust passage 12. Positioned within the deposition chamber is the cylindrical substrate unit 13 which is provided with the annular forming segment such as 14 to represent and define the contour of the shape desired in the ultimate product. In the case of the illustration the substrate 13 is intended for the formation of a free-standing nozzle or throat section to be employed in a rocket engine and is accordingly in the form of a cylindrical shell about the interior surface 15 and the interior surface of the forming section 14 of which the pyrolytic material is to be built up. According to conventional molding practice the cylindrical shell may be formed in two or more parts longitudinally of the cylindrical surface which may be hinged so that the shell can be opened once the material has been deposited therein to permit easy removal of the finished product. In heating proximity to the substrate, either within or without the deposition chamber and in the case of the embodiment illustrated surrounding the chamber is a heating unit such as the electrical induction heating coil 16 which may be electrically energized (by means not shown) to bring the substrate while it is within the chamber to a temperature at which a gas phase plating reaction between it and the deposition gas may take place to deposit the pyrolytic coating about the inner surface 15.

To maintain a flow of deposition gas through the cylindrical shell 13, the exhaust passage 12 from the substrate chamber may also be in communication with the substrate base 18 as for example by being connected to the opening 17 therethrough. This same exhaust passage so connected with the substrate is journaled in the opening 19 through the end wall 20 of the deposition chamber so that the exhaust conduit and the substrate to which it is connected will be freely rotatable and may be rotatably driven as for example under the influence of the electric motor 21 acting through the driven shaft 22, the pulleys 23 and 24, the latter being keyed to the exhaust conduit 12, and a suitable power transmission link such as the V-belt 25.

The inlet passage 11 is composed of an electrically conductive material such as steel or other metal as are the components 13, 14, and 15 of the substrate assembly and at least that portion of the discharge conduit connected to and projecting some distance from the base opening of the substrate assembly. By means of the generator 26 or other power source and the conductor wires 27 and 28, a high voltage electromotive force on the order of 100,000 volts is applied between the metal inlet tube 11 and the exhaust channel 12 as a result of which an electrostatic field is established between the metal tube and the substrate assembly 13.

In operation, a deposition gas containing a vaporized pyrolytic material such as graphite or silicone carbide formed by methods and in apparatuses known to the art and are therefore not shown is introduced into the deposition chamber 10 via the inlet tube 11 to impinge upon and flow around the substrate assembly and out the discharge conduit 12. During at least a part of the time that the deposition gas is so moving, a plurality of discrete fibers are also blown into the deposition chamber and over and around the substrate. Depending upon the fluid dynamics of the incoming deposition gas, the fibers may be injected into the deposition gas stream or they may be carried by a separate flow of a gas such as an inert carrier gas like nitrogen, argon or the like.

As the fibers enter the electrically energized metal tube and the electrostatic field established by the high voltage or potential difference between the tube and the substrate, they are influenced electrostatically relative to the substrate so that they will tend to align themselves perpendicularly to the substrate surface. Because the discharge flow of the gas and fibers from the chamber is directed through the particular cylindrical substrate shown, it can be appreciated that substantially all of the fibers entering the chamber will pass through the interior of the substrate; and many of them as they so do will adhere to the interior of the substrate surface. This adherence of the fibers to the substrate is in particular response to the steady building up about this interior substrate surface of the coating of pyrolytic material which is being extracted from the vaporized pyrolytic precursor upon the contact of the deposition gas with the heated substrate.

Figure 2:
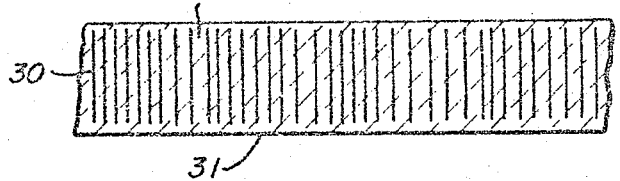
FIGURE 2 is an enlarged fragmentary cross sectional view of a composite material manufactured according to this invention.

A sample of the composite material resulting from the simultaneous introduction of the fibers and deposition gases upon the heated substrate while electrostatic field exists between the fibers and the substrate is illustrated in FIGURE 2 wherein the refractory matrix material such as the pyrolytically deposited silicon carbide 29 includes the plurality of fibers 30 which are perpendicular to the surface such as the bottom surface 31 corresponding to the heated substrate surface. As previously indicated, the fibers 30 which, for the purposes of this invention, may be preformed in a variety of manners known to the art before injection into the deposition chamber along with the deposition gas, may be of a variety of materials including pyrolytic materials as well so that in one preferred embodiment of the invention, both the matrix 29 and the discrete fibers 30 may be composed of silicon carbide or other pyrolytic materials such as graphite, other carbides, nitrides, borides and the like. While routine modifications of the apparatus may be made to accommodate a wide variety of fibers, they must of course for the purposes of this phase of the invention be capable of being influenced by the electrostatic field. On the other hand, fibers over broad size ranges of from .001 to 0.1 inch in length and from .00001 to .001 inch in diameter can be conveniently incorporated in a pyrolytic matrix according to the method and apparatus herein disclosed.

The apparatus illustrated in FIGURE 1 may be used to achieve a slightly different fiber arrangement by discontinuing the energization of the metal tubes at the inlet and exhaust of the chamber thereby eliminating the electrostatic field and by causing the substrates within the deposition chamber to rotate while the deposition gases and fibers are passing thereover. Under such circumstances, the fibers will tend to align themselves parallel rather than perpendicularly to the substrate surface and, in the manner of the perpendicular fibers, will be held against the substrate by the development of the pyrolytic coating being deposited from the vaporized pyrolytic material. While in some instances, it may be desirable to have all of the fibers arranged either perpendicularly or parallel to the substrate surface, a more unique arrangement as shown in FIGURE 3 results when the electrostatic field and the substrate rotating device are used alternatively in sequence.

Thus, at the commencement of the formation of the refractory product such as the rocket nozzle section, the electrostatic field may be established so that the fibers first entering the chamber and contacting the substrate are aligned perpendicularly to the surfaces thereof. Once the pyrolytic coating has built up to the point at which the perpendicularly disposed fibers are held in place by the presence of the pyrolytic material however, the electrostatic field may be terminated and the rotation of the substrate begun. At this point, the perpendicular fibers will still extend above the thickness of the deposited coating; and, as a result, the fibers tending to align themselves parallel to the substrate surface in response to its rotation will become interspersed in those perpendicular fibers or the portions thereof extending above the pyrolytic coating so that, as the coating continues to build up and engulf the fibers parallel to the substrate surface, there will result a pattern of fibers some of which are perpendicular and some of which are parallel to the substrate surface.

Figure 3:
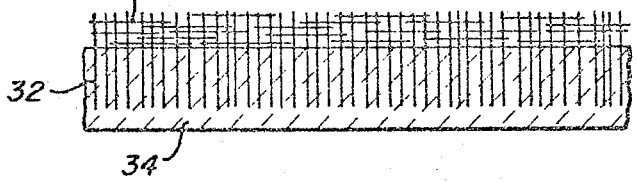
FIGURE 3 is an enlarged fragmentary cross sectional view of a modified composite material according to the present invention at an intermediate stage of its manufacture.
Figure 4:
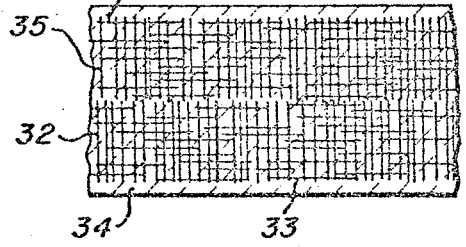
FIGURE 4 is an enlarged fragmentary cross sectional view of a material according to the present invention and the modification thereof in FIGURE 3 at the completion of its manufacture.

As illustrated in FIGURE 3, where the substrate surface is planar, all of the perpendicular fibers 32 will be parallel to each other as will all of the fibers which are parallel to the substrate surface. Consequently, the perpendicular fibers 32 will be at substantial right angles to the parallel fibers 33 as a result of which the matrix composition 34 will contain fibers which are in effect cross woven to provide particularly great reinforcing strength to the composite material. It will also be appreciated that the alternate operation of the electrostatic field and the rotation of the substrate as the deposition and fiber build-up continue may result in a composite material of a plurality of superimposed layers such as shown in FIGURE 4. To achieve this fiber arrangement, the first fibers 32 entering the substrate are influenced by the electrostatic field whereas the next fibers 33 to become parallel to the substrate are influenced solely by the rotation thereof. Once the pyrolytic matrix has built up to the point at which it covers all of the fibers 33 and 34 first deposited, the electrostatic field may again be energized to provide a second layer of perpendicularly disposed fibers 35 which, upon discontinuance of the electrostatic field and resumption rotation of the substrate will themselves be interspersed with the fibers 36 arranged parallel to the substrate surface.

It has been found that the nature of the simultaneous alignment of the fibers and deposition of the pyrolytic material therearound is such that the relationship between the matrix or continuous phase and the fibers or discrete particles is extremely intimate, the discrete particles being completely and firmly surrounded by and encased within the matrix material so that the composite is of practically theoretical density insofar as the pure pyrolytic material is concerned. This integration between the fibers and the continuous phase provides great improvement in the dimensional stability of the composite as well as in its ability to withstand erosion under exposure to high shear stresses under high thermal environments as a result of all of which highly refractory pyrolytic products may be manufactured to withstand extremes of stress, temperature and chemical as well as mechanical degradation and erosion. The method and apparatus of this invention can be manipulated by suitable adjustments according to established deposition techniques to accommodate almost any pyrolytic material and almost any type of fiber to be embedded therein. Moreover, a single composite material may be made to have a variety of different properties and characteristics by changing the deposition gas or the blend of deposition gases as well as the fibers or blends of fibers while the single composite is being formed. Thus, the deposition gas initially introduced into the chamber may be a methane series gas capable of providing a carbon or graphite coating to engulf graphite fibers being simultaneously introduced. At a later stage in the growth of the composite, the methane series gas may be admixed with a silane or borane so that a silicon carbide or a boride will be deposited along with the graphite. By steadily increasing the second gaseous component and diminishing the first, the matrix composition may be changed from one of pure graphite to one of pure carbide, boride, nitride or the like. It of course follows that the mixture of fibers being introduced may be similarly changed during the deposition to obtain an infinite assortment of physical properties at various levels and at different rates of change within the composite.

I claim:
1. A pyrolytic composite material having an upper surface and consisting of plural layers of discrete pyrolytic fibers imbedded in a matrix of pyrolytic material, said pyrolytic fibers being selected from the group consisting of graphite, borides, nitrides, and carbides, said pyrolytic fibers being arranged so that at least one layer is perpendicular to said surface of the composite and at least one layer is parallel to said surface of the composite, and said matrix being selected from the group consisting of graphite, borides, nitrides and carbides.

2. A composition of matter according to claim 1 wherein said fibers are graphite and wherein said matrix is graphite.

3. A composition of matter according to claim 1 wherein said fibers are silicon carbide and wherein said matrix is silicon carbide.

References Cited
UNITED STATES PATENTS

| | | | |
|---|---|---|---|
| 3,047,442 | 7/1962 | Bozzacco | 161—193 XR |
| 3,142,960 | 8/1964 | Bluck | 60—35.6 |
| 3,238,054 | 3/1966 | Bickerdike et al. | 117—46 |
| 3,252,814 | 5/1966 | Russell et al. | 106—57 |
| 3,351,484 | 11/1967 | Gutzeit | 117—46 XR |

ROBERT F. BURNETT, Primary Examiner

WILLIAM A. POWELL, Assistant Examiner

U.S. Cl. XR.

23—208; 106—44, 55; 117—17, 26, 106; 118—11, 49.5; 161—156, 170